Patented Nov. 13, 1928.

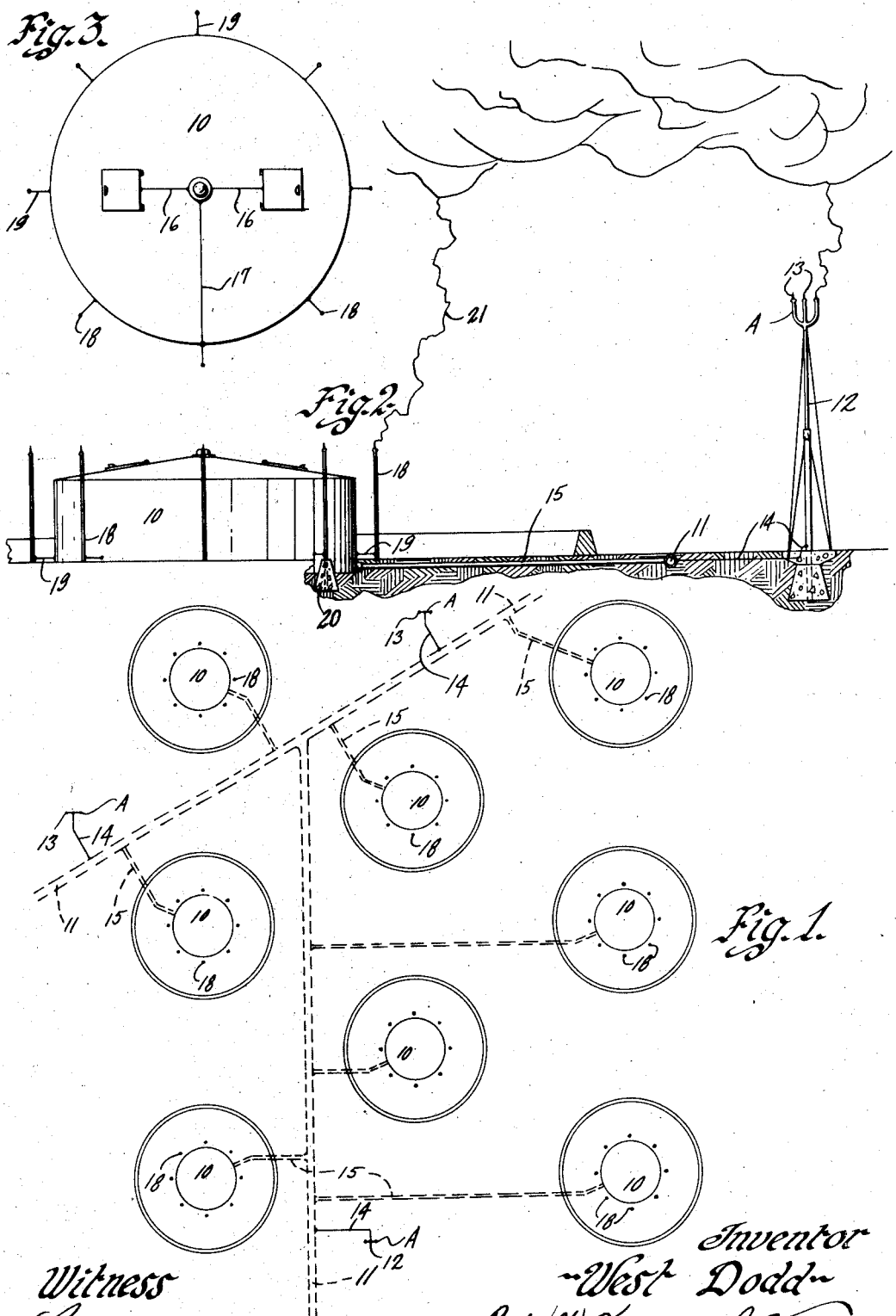

1,691,340

UNITED STATES PATENT OFFICE.

WEST DODD, OF DES MOINES, IOWA.

METHOD AND SYSTEM FOR PROTECTING PETROLEUM TANKS AND TANK FARMS AGAINST LIGHTNING.

Application filed May 15, 1926. Serial No. 109,310.

My invention has for its purpose to provide a method and system for protecting petroleum tanks and tank farms against lightning.

More particularly, it is my purpose to provide a system for protecting petroleum tanks and tank farms, whereby sparking at and directly above the tanks will be prevented, and whereby "direct hits" at the tanks will be prevented and whereby induced electricity or electric discharges from the earth will be conducted and localized away from the tanks to attract those discharges of opposite polarity from the clouds above to create lightning flashes at a distance from and to one side of and not directly above the tanks.

With these and other objects in view, my invention consists in the method herein explained and in the construction, arrangement and combination of the various parts of my device, whereby the objects contemplated are attained, as hereinafter more fully set forth, pointed out in my claims, and illustrated in the accompanying drawings, in which:

Figure 1 shows a diagrammatic plan view of a system embodying my invention.

Figure 2 is an elevation partly in section, illustrating part of the system; and Figure 3 is a top or plan view of one of the tanks equipped in accordance with my system.

It is well-known that in the oil fields tremendous losses occur as a result of fires caused by lightning.

Petroleum storage tanks can be fired by lightning in two ways and only two. One way is by electrostatic sparks occurring in spaces between metals on a tank, where such metals have poor or no metallic connections and thus offer resistance to electrical conductivity. Where a tank is charged with electricity as frequently occurs during thunder storms, the metal parts spaced from each other, serve as spark gaps across which the electricity may jump and create sparks or flashes of lightning. The spark thus caused sets fire to inflammable gases escaping from the tank, resulting in expensive fires.

These sparks are likely to occur in case of a lightning discharge at a very considerable distance from a tank. The cure for such sparking is to avoid the sparking between gaps on and above the roof of the tank.

The other way in which lightning may fire a tank is by a so-called "direct hit" at the tank. The way to avoid this danger is to collect and convey the electricity away from the tank and provide means for localizing the lightning discharges or flashes to one side of and higher than the rim or roof of the tank. This result is attainable by the installation of the system herein described.

An understanding of my method and system may be made easier by a brief description of the way in which electrical discharges at a tank are made likely and caused.

Let it be assumed that a cloud is traveling a considerable distance above the earth toward a tank or tank farm. The cloud is charged with electricity of one polarity. A charge of electricity of opposite polarity follows along the earth's surface with the cloud. When the earth electricity reaches the tank farm, any of its metal parts or structures immediately become charged. The fact that the tanks are always connected with metal pipe lines greatly increases the likelihood of the tanks becoming charged by induced electricity from the earth electrical field.

When the tanks are charged with electricity, then if a lightning discharge occurs even at a distance of miles from such tank, there is likely to be sparking on the tank between the metal parts thereof, which are not metallically connected or are connected by means having poor electrical conductivity. If such a spark occurs where there is escaping inflammable gas, a conflagration results.

When the electric tension on a tank or reservoir becomes great enough, a "direct hit" will occur at the tank, thus firing the inflammables gases.

My invention has as its purpose to provide a method and system by which protective results can be attained by removing the cause from the tank.

First. The preventing of "direct hits" by lightning at the tank. This is accomplished by preventing the accumulation of a charge on the tank and also by providing means by which a "direct hit" in the immediate neighborhood of the tank is caused to occur not at the tank, but at a point spaced from the tank.

Second. The preventing of sparking between the disconnected metallic parts of the tank. This result is attained by connecting the metallic parts by conducting wires or the like and also by conducting the electricity, which may have accumulated around the tank and discharging it into the air.

In Figure 1, I have shown a tank farm having the storage tanks indicated by the reference numeral 10. In all instances, pipe lines 11 lead from a distance to the farm and therefrom, and the tanks are connected at their bottoms only with the pipe lines for receiving incoming oil and discharging outgoing oil, and are electrically connected with each other by such pipe lines. Pipe lines are specially good electric conductors and induced electricity easily travels along the pipe lines to the farm from long distances away.

The tanks are thus likely to accumulate charges of electricity and to become focal points for lightning discharges or to be subject to sparking where lightning discharges occur at a distance, as has been briefly stated above.

In order to avoid as far as may be the accumulation of electrical charges on the tank, I erect at suitable spaced intervals on the farm on the high points indicated generally by the reference character A, which may comprise towers 12 one or a plurality of sharp discharge points 13 at their upper ends. These points should be substantially higher than the tanks 10.

All of the towers A are connected electrically with the pipe line at such points that induced electricity traveling along the pipe lines toward the tanks on the farm will travel up the towers and be discharged through the points 13.

The connections between the high points of the towers A and the pipe lines are indicated at 14, and the connections directly between the towers or high points 12 and the tanks are indicated at 15.

Where these high points or towers are thus provided and are electrically connected with the pipe lines 11 and the tanks 10, it will be seen that there is much less likelihood than would otherwise be true of the accumulation of charges of electricity at the tanks, because the induced electricity, which might otherwise follow the pipe line to the tank is diverted by self-repulsion from the tank to the towers or high points by seeking its path of least resistance and discharged therefrom to the air.

Furthermore, a charge of electricity on the tank will be conducted through the connections to the high points and discharged therefrom into the air.

The whole tank farm is thus protected against the accumulation of electrical charges, and this is one of the great purposes of my system and method.

In order to prevent sparking at the tanks between detached metal portions thereof, I connect all of such metal portions as by connections 16 and 17 shown in Figure 3.

Assuming that the main wall of the tank is metal, which is an electrical conductor, it will be understood that the detached metal parts, which have thus been connected together are connected with the side wall, and the side wall is then connected as at 15 directly with the towers or high points, or the side walls are connected by pipe lines with the towers or high points. Thus the parts are not only connected against sparking, but the accumulated discharge of electricity is conducted away and discharged into the air at localized points away from the tanks as above described.

For avoiding "direct hits", I provide means in addition to the towers or high points already described. Before describing such means in detail, it may be well to say that "direct hits" on a tank always occur under normal tank conditions at the outer rim of the tank roof. A "direct hit" on a tank will occur only when the tank is charged, and only at the outer rim of the tank, because electricity of similar sign is self-repellent and intensifies the charge at the outer rim.

For avoiding "direct hits", I install a plurality of points 18 around the tank spaced a distance of several feet therefrom, and electrically connected with the bottom of tank, as at 19. This in effect sets the rim of the tank out and away from the places where there may be escaping inflammable gases, or in other words, the self-repellent nature of similar sign electricity seeking its path of least resistance directs the charge to the points and away from the tank.

The flash of fire, which we call a "lightning discharge", which occurs due to the attraction of the electricity in the cloud for the electricity of opposite polarity at the earth, will always terminate at the upper end of one of the sharp points 18 and never at the rim of the tank, when metallic connections are properly made.

In making the above statement, I leave out of consideration the high points or towers and consider only the arrangement of the points 18 around the tank and electrical connection therewith preferably at the bottom of the tank.

The points 18 may be set in concrete 20 in the ground. The points 18 should extend as high or higher than the peak of the tank roof.

It will thus be seen that I have by means of my system and the practice of my method largely eliminated the likelihood of any dangerous accumulation of charges of electricity on the tanks of a farm, by conducting the electricity to the discharging points or towers instead of at the tanks.

This also tends to reduce sparking on the tank, because intense sparking occurs only on a highly charged tank with spark gaps.

I further eliminate the danger of the sparking on the tank by electrically connecting the metallic parts of the tank.

I thus prevent both sparking and a "direct hit" at the tank by electrically connecting the metallic parts of the tank with each other and with metallic points spaced from the tank, so that the flash indicated at 21 will terminate at the upper end of one of these sharp points rather than at the tank rim.

I thus substantially eliminate the danger of fire caused by lightning at a petroleum storage tank, either by sparking or "direct hits".

It will be understood that the method may be practiced with some variation and that the parts of the system may be constructed and arranged in different ways without departing from the real spirit and purpose of my invention, and it is my intention to cover by my claims, any modified forms of structure or use of mechanical equivalents or any variations in the practice of the steps of the method, which may be reasonably included within their scope.

I claim as my invention:

1. In a system for protecting tanks, the combination of a plurality of tanks having metallic parts, means for electrically connecting said parts, a plurality of points arranged around the tanks spaced relatively short distances from the side walls thereof, a pipe line communicating with the tanks at the bottoms only, metallic towers spaced at greater distances from the tanks, terminating in metallic points, means for connecting said first-described points with the bottoms only of the adjacent tanks, and means for electrically connecting the points on the towers with the pipe line at locations farther from the tanks than are the first-described points.

2. A method for protecting tanks and tank farms having pipe lines connected with the tanks, at the bottoms only, against lightning and electrical discharge, consisting in connecting the metallic parts of the tanks together electrically and connecting the bottoms of the tanks with means for collecting electricity repelled from the tanks and conducting it to locations spaced from the sides of and higher than the tanks, and providing means substantially higher than the tanks and spaced substantially further from the tanks for discharging charges of electricity on the pipe lines connected with the tanks.

WEST DODD.